United States Patent [19]

Vassiliades

[11] 4,273,672

[45] * Jun. 16, 1981

[54] MICROENCAPSULATION PROCESS

[75] Inventor: Anthony E. Vassiliades, Deerfield, Ill.

[73] Assignee: Champion International Corporation, Stamford, Conn.

[*] Notice: The portion of the term of this patent subsequent to May 27, 1992, has been disclaimed.

[21] Appl. No.: 448,731

[22] Filed: Mar. 6, 1974

Related U.S. Application Data

[63] Continuation of Ser. No. 174,045, Aug. 23, 1971, Pat. No. 3,886,084, which is a continuation-in-part of Ser. No. 583,046, Sep. 29, 1966, abandoned.

[51] Int. Cl.³ .............................................. B01J 13/02
[52] U.S. Cl. .................................... 252/316; 71/64 F; 282/27.5; 424/32; 424/33; 424/34; 424/35; 424/37; 426/98; 428/307; 428/914
[58] Field of Search ................... 252/316; 424/32, 33, 424/34, 37; 427/212

[56] References Cited

U.S. PATENT DOCUMENTS

| | | | |
|---|---|---|---|
| 3,137,631 | 6/1964 | Soloway | 252/316 X |
| 3,201,353 | 8/1965 | Corben | 252/316 |
| 3,594,328 | 7/1971 | Schibler | 252/316 |
| 3,886,084 | 5/1975 | Vassiliades | 252/316 |

FOREIGN PATENT DOCUMENTS 1091078  11/1967  United Kingdom ..................... 252/316

*Primary Examiner*—Richard D. Lovering
*Attorney, Agent, or Firm*—Roylance, Abrams, Berdo & Farley

[57] ABSTRACT

Microcapsules are formed in the absence of coacervation by providing an oil-in-water emulsion containing a polymeric, emulsifying agent having cross-linkable groups or complexing sites and admixing with the emulsion a cross-linking agent or a complexing agent which forms an impermeable coating around the dispersed oil droplets. The emulsifying agent may be non-proteinaceous or the protein, gelatin. Impermeable capsule walls are formed solely by the addition of the cross-linking or complexing agent and extraneous hardening agents are obviated. Moreover, the emulsifying agent may be a preformed, polymeric, cross-linking agent which eliminates the need for any separate cross-linking agent.

6 Claims, No Drawings

MICROENCAPSULATION PROCESS

This is a continuation of application Ser. No. 174,045 filed Aug. 23, 1971 in the name of A. E. Vassiliades, now U.S. Pat. No. 3,886,084, which, in turn, is a continuation-in-part of U.S. Application Ser. No. 583,046 filed Sept. 29, 1966, in the name of A. E. Vassiliades now abandoned.

This invention relates to the microencapsulation of oils. More specifically, this invention pertains to processes for encapsulating minute oil droplets, to microcapsules produced thereby, and to the use thereof in pressure-responsive, transfer-copy systems.

Microcapsules containing both liquid and solid nucleus materials have found widespread acceptance in a variety of commercial applications. For example, one of the most widespread uses has been in the art of transfer-copy systems wherein minute droplets of a colorless dye intermediate dispersed or dissolved in an oil are encapsulated and coated onto a transfer sheet. The dye intermediate is thereafter transferred to a copy sheet by rupturing said capsules. The underlying copy sheet has an adsorbent coating thereon containing a material which will react with the dye intermediate causing a visible colored mark at points where the microcapsules have been ruptured and the dye transferred. Other recent applications in which microcapsules have been used extensively are in adhesives and adhesive tapes, fertilizers, pharmaceuticals, foods and cosmetics. In the majority of these applications, microencapsulation involves the "coacervation" phenomenon.

Coacervation is the term applied to the ability of a number of aqueous solutions of colloids, to separate into two liquid layers, one rich in colloid solute and the other poor in colloid solute. Factors which influence this liquid-liquid phase separation are: (a) the colloid concentration, (b) the solvent of the system, (c) the temperature, (d) the addition of another polyelectrolyte, and (e) the addition of a simple electrolyte to the solution. This phenomenon is extensively described in the book *Colloid Science* edited by H. R. Kruyt, Volume II, Reversible Systems (published in 1949 by the Elsevier Publishing Company, Inc.), particularly in Chapter VIII entitled "Crystallisation-Coacervation-Flocculation"; Chapter X, entitled "Morphology of Coacervates", by H. G. Bungenberg deJong.

A unique property of coacervation systems is the fact that the solvent components of the two phases are the same chemical species. This is a major distinguishing characteristic of coacervates as compared to two phase systems involving two immiscible liquids. Thus, a colloidal solute particle migrating across the interface of a two-phase coacervate system finds itself in essentially the same environment on either side of the interface. From the viewpoint of composition, the difference between the two phases is a difference in concentration of solute species. Structurally, the two phases differ in that the colloidal solute of the colloid-poor phase is randomly oriented and the colloidal solute of the coacervate or colloid-rich phase shows a great deal of order. In all cases where coacervation has been observed, the solute species are geometrically anisotropic particles.

Coacervation can be of two general types. The first is called "simple" or "salt" coacervation where liquid phase separation occurs by the addition of a simple electrolyte to a colloidal solution. The second is termed "complex" coacervation where phase separation occurs by the addition of a second colloidal species to a first colloidal solution, the particles of the two dispersed colloids being oppositely charged. Generally, materials capable of exhibiting an electric charge in solution (i.e. materials which possess an ionizable group) are coacervable. Such materials include natural and synthetic macromolecular species such as gelatin, acacia, tragacanth, styrene-maleic anhydride copolymers, methyl vinyl ether-maleic anhydride copolymers, polymethacrylic acid, and the like.

With both simple and complex coacervate systems, a necessary precondition for coacervation is the reduction of the charge density of the colloidal species. In the case of simple coacervation, this reduction of the charge density along with partial desolvation of the colloidal species is similar to that preceding the flocculation or precipitation of a colloid with the addition of a simple electrolyte since it is known that the addition of more electrolyte to a simple coacervate leads to a shrinking of the colloid-rich layer and the subsequent precipitation of the colloidal species. This same reduction of charge density along with partial desolvation of the colloidal species which precedes the precipitation of two oppositely charged colloids from solution may also be regarded to be the cause for the phase separation in a complex coacervate system. However, while the reduction of the charge density is a necessary precondition for coacervation, it is oftentimes not sufficient for coacervation.

In other words, the reduction of the charge density on the colloidal particles must alter or modify the solute-solute interactions to such an extent that the colloidal particles will tend to aggregate and form a distinct, continuous liquid phase rather than a flocculant or a solid phase. This tendency is attributable to both coulombic and long-range Van der Waal's interactions of large aggregates in solution. Thus, in both "simple" and "complex" coacervation, two-solution phase formation begins with the colloidal species aggregating to form submicroscopic clusters; these clusters coalesce to form microscopic droplets. Further coalescense produces macroscopic droplets which tend to separate into a continuous phase. This phase appears as a top or bottom layer depending upon the relative density of the two layers.

If, prior to the initiation of coacervation, a water-immiscible material, such as an oil, is dispersed as minute droplets in an aqueous solution or sol or an encapsulating colloidal material, and then, a simple electrolyte, such as sodium sulfate, or another, oppositely charged colloidal species is added to induce coacervation, the encapsulating colloidal material forms around each oil droplet, thus investing each of said droplets in a liquid coating of the coacervated colloid. The liquid coatings which surround the oil droplets must thereafter be hardened to produce solid-walled microcapsules.

For example, in U.S. Pat. No. Re. 24,899 to Green wherein the phenomenon known as simple coacervation is employed in the formation of microcapsules, a gelable colloid such as the proteinaceous material, pigskin gelatin, is emulsified and then caused to form a liquid coating around an oil droplet. The liquid coating is thereafter gelled by cooling in order to form the microcapsular wall. Subsequent to the formation of the gelled wall, it is cross-linked or hardened by the use of formaldehyde as a cross-linking agent for the gelatin. Thus, such systems involve: (1) a phase separation step wherein a liquid coating is formed around the droplet;

(2) a cooling step wherein the liquid wall is gelled; and (3) a hardening step in which the gelled wall is cross-linked.

Similarly, other microencapsulation processes, such as that described in U.S. Pat. No. 3,137,631 to Soloway, employ a proteinaceous material, i.e., a heat denaturable protein such as egg albumin, which is denatured to form the microcapsular shell. In order to impart increased stability to the capsule wall, the use of known cross-linking agents for proteins, such as formaldehyde and glyoxal are suggested.

Still another technique, preferably involving gelable materials is described in U.S. Pat. No. 3,201,353 to Corbin, which patent discloses the employment of a water-soluble zirconium-containing compound to precipitate a proteinaceous, hydrophilic colloid, e.g., gelatin, in order to encapsulate a water-immiscible material. As in the previous patents described, it is indicated that the capsules can be hardened by employing formaldehyde (column 4, lines 57, et sequa of the patent).

Thus, in processes involving coacervation, a liquid wall is first formed about an oil droplet, which wall must thereafter be hardened, while in other processes, for example, the Soloway and Corbin processes previously mentioned, the capsule walls are formed by denaturing a heat denaturable protein or precipitating a zirconium-containing complex, respectively, and thereafter hardening to provide increased stability and presumably impermeability of the capsule shell.

A more recently issued patent relating to microencapsulation, viz, U.S. Pat. No. 3,516,941 to Matson, describes the formation of an impermeable shell of a urea-formaldehyde polymer by the acid-catalyzed polymerization of a low molecular weight amino aldehyde precondensate. This patent specifically indicates that wetting agents or emulsifiers must be substantially excluded.

In contrast to the present invention, one of the primary disadvantages of the coacervation encapsulation techniques is the fact that critical control over the concentrations of the colloidal material and the coacervation initiator must be maintained. That is, coacervation will occur only within a limited range of pH, colloid concentration and/or electrolyte concentration. For example, in simple coacervation, if a deficiency of the electrolyte is added, two-phase formation will not occur whereas, if an excess is added, the colloid will precipitate as a lumpy mass. With complex coacervation systems using a colloid having an isoelectric point, pH is especially important since the pH must be adjusted and maintained at a point where both colloids have opposite charges. In addition, when a gelable colloid, such as gelatin, is used as the encapsulating material, coacervation must take place at a temperature above the gel point of the colloid.

It is therefore, the object of this invention to provide a process for the microencapsulation of oils which is devoid of the coacervation phenomenon and the disadvantages inherent therewith.

It is another object of this invention to provide oil-containing microcapsules without the necessity for a particular electrolytic concentration or a coacervating agent.

It is yet another object of this invention to provide oil-containing microcapsules comprising walls of either non-gelable or gelable colloids.

It is another object of this invention to provide a pressure-sensitive and responsive transfer sheet record material comprising a coating of microcapsules applied to one side of a web material, said microcapsules containing a colorless dye intermediate dispersed or dissolved in an oil and said microcapsules having been prepared by the process of this invention.

These and other objects and features of this invention will become apparent from the following description of the invention.

According to the present invention, a process is provided for the formation of microcapsules in the absence of coacervation, which process, in general, includes forming a primary oil-in-water emulsion, which emulsion comprises a water-immiscible oily material dispersed in the form of microscopic droplets in a colloidal solution of one or more emulsifying agents, said oily material and said emulsifying agent or agents having about the same hydrophilic-lipophilic balance (HLB), and at least one of the said emulsifying agents possessing groups capable of reacting with a cross-linking or complexing agent to form an oil impermeable coating around the dispersed microscopic droplet.

A cross-linking or complexing agent is slowly added to the emulsion with brisk agitation, and this is continued until the final microcapsules are formed. The emulsion containing the microcapsules may be directly coated onto a web material, or, alternatively, the microcapsules may be separated from the emulsion by physical means, such as filtration or centrifugation, washed to remove any excess oil and, if desired, the microcapsules may be redispersed in a solution of a binder and coated onto a web material.

In contradistinction to prior encapsulation processes, the emulsifying agents of the present invention are "dual functional," i.e., they not only act as emulsifying agents, but they also form the capsule shell, in contrast to prior processes which employ either: (1) an emulsifying agent and a separate film forming material; or (2) a film forming material in the substantial absence of an emulsifying agent. Still further, as indicated hereinabove, an impermeable coating is formed about the oily droplet when emulsification is complete, and the cross-linking or complexing agent has reacted with the emulsifying agent. The cross-linking and complexing agents of the present invention are also dual functional. They not only take part in the formation of the capsule shell, but they form a hardened capsule wall to an extent that they eliminate the need for additional hardening agents. Thus, extraneous hardening agents are not required in order to provide an impermeable coating having substantial structural integrity and oil impermeability, as is the case in prior processes.

According to one aspect of the invention, the present emulsifying agents are non-proteinaceous, polymeric emulsifying agents possessing groups capable of reacting with a cross-linking or complexing agent to form an impermeable coating around dispersed microscopic droplets, when emulsification is complete.

According to a still further aspect of the invention, the emusifier is a proteinaceous material, such as gelatin, which is cross-linked by an aldehyde, e.g., formaldehyde, to form an impermeable coating at the completion of emulsification and when the cross-linking agent has reacted with the emulsifying agent.

Thus, in contradistinction to prior encapsulation processes wherein gelatin has been employed, there is no need to employ a salt, such as in the case of simple coacervation, or form a zirconyl complex of the gelatin, or denature the protein by heat or other means prior to forming the solid-walled microcapsules. Likewise, the subsequent or concurrent employment of a separate hardening agent is eliminated.

Both the proteinaceous and the non-proteinaceous emulsifying agents of the present invention are cross-linked or complexed to form solid-walled microcapsules having non-metallic bonds. In addition, the impermeable coating is formed around the dispersed oil droplets solely by adding the cross-linking or complexing agent of the present invention to the emulsion. For present purposes, the term "solely" as used herein is intended to exclude the addition of extraneous hardening agents or metal complexing agents along with or subsequent to the addition of the complexing and cross-linking agents of the present invention.

Thus, according to one aspect of the present invention, microcapsules are formed in the absence of coacervation by the steps of:

(A) forming a primary oil-in-water emulsion, which emulsion comprises a water-immiscible oily material dispersed in the form of microscopic droplets in a colloidal solution of one or more non-proteinaceous, polymeric emulsifying agents having about the same hydrophil-lyophil balance as the oily material, and at least one of said emulsifying agents being selected from the group consisting of an emulsifying agent possessing cross-linkable groups and an emulsifying agent possessing complexing sites;

(B) forming an impermeable coating around said dispersed oil droplets solely by providing to the emulsion a polymeric or monomeric cross-linking or complexing agent such as, for example, polyvinyl alcohol, gelatin, gum tragacanth, ethanolamine, ethylene diamine, a borate, methylcellulose, an aldehyde, or an A-stage formaldehyde condensation product.

The cross-linking or complexing agent reacts with the emulsifying agent so as to form an impermeable coating around each dispersed oil droplet and provides microcapsules having structural integrity. The emulsifying agent and cross-linking or complexing agent are admixed slowly and under conditions of brisk agitation.

According to a second aspect of the invention, microcapsules are formed in the absence of coacervation by a process that is identical to that previously described, with the exception that the emulsifying agent is gelatin and the cross-linking agent is an aldehyde.

According to still another aspect of the present invention, the encapsulating material may also be an emulsifying agent which is self cross-linking. In such a case, the separate addition of a cross-linking agent is unnecessary.

The encapsulating material of this invention which encloses the microscopic oil droplets is an emulsifying agent which is a preformed polymer and which broadly, has two main characteristics: (1) it possesses reactive groups capable of reacting with a cross-linking or complexing agent to form an impermeable coating about the microscopic oil droplets; and (2) it has an HLB balance similar to that of the oil employed. As previously indicated, the encapsulating material may also be an emulsifying agent which is self cross-linking.

Exemplary of emulsifying agents having the aforesaid characteristics which permit their employment in the instant invention are: non-proteinaceous, polymeric, materials such as naturally-occurring colloids including gums and polysaccharides, such as gum tragacanth, and guar gums. Likewise, synthetic polymeric materials including copolymers of maleic anhydride with an ethylenically unsaturated monomer, such as ethylene, styrene, dodecene, methyl vinyl ether, and the like, may be suitably employed. For example, copolymers of methyl vinyl ether and maleic anhydride are commercially available, for example, from the General Aniline and Film Corporation and are sold under the trademark "Gantrez". These alkali-soluble copolymers have the general structure:

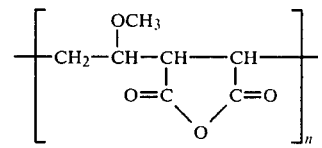

Other synthetic emulsifying agents include hydroxyl-containing polymeric materials, such as polyvinyl alcohol, methylcellulose, or the like.

Proteinaceous emulsifying agents, such as gelatin also possess reactive groups capable of reacting with a cross-linking agent to form an impermeable coating, and has an HLB balance similar to the oil. The cross-linking agent is admixed with the gelatin at a temperature above the gel point of the gelatin for ease of handling and in order to achieve efficient admixing.

Emulsifying agents which are self cross-linking include, for example, reaction products of an hydroxyl-containing polymeric emulsifying agent such as polyvinyl alcohol or methylcellulose, or a copolymer of maleic anhydride and an ethylenically unsaturated monomer, e.g. styrene, ethylene, etc., with a self-condensing thermosetting prepolymer, e.g. a formaldehyde condensation product, such as urea-formaldehyde, melamine-formaldehyde, phenol-formaldehyde, etc. For example, such self cross-linking emulsifiers may be prepared by adding the self-condensing thermosetting resin prepolymer in an amount of between 10 and about 150 percent, preferably between about 40 and 100 percent (based upon the emulsifying agent) to an aqueous solution of the emulsifying agent, e.g. polyvinyl alcohol, (2–20 percent, preferably 5–10 percent), and adjusting the pH to from about 3–6. The resulting mixture is heated for between about 2 and about 12 hours at about 60° to about 100° C. and is then neutralized and cooled in order to inhibit further reaction.

The cross-linking or complexing agents employed with the aforesaid emulsifying agents include, for example, monomeric compounds, such as the aldehydes, e.g. formaldehyde, glyoxal, glutaraldehyde and other formaldehyde donors, trioxane, ethanolamine, ethylene diamine, boric acid, the borates, e.g., sodium borate; and macromolecular species, such as gelatin, gum tragacanth, methylcellulose, and A-stage formaldehyde condensation products.

As previously mentioned, these agents serve the dual function of not only combining with the emulsifying agent to form the capsule wall, but also hardening the capsule wall to such an extent that no extraneous hardening agent is required to provide an oil impermeable coating having structural integrity.

While some of the cross-linking or complexing agents are suitable for use with a plurality of emulsifying agents, others are not. Thus, preferred cross-linking or complexing agent-emulsifying agent pairs include: (1) gelatin with an aldehyde, such as formaldehyde; (2) polyvinyl alcohol with a borate, e.g., sodium borate; (3)

copolymers of methyl vinyl ether and maleic anhydride with any of gelatin, gum tragacanth, ethanolamine, ethylene diamine, polyvinyl alcohol; (4) guar gum derivatives with any one of a borate, e.g., sodium borate, or methylcellulose; (5) self cross-linking emulsifiers with themselves; and (6) methylcellulose with an aldehyde, e.g., glyoxal, or an A-stage formaldehyde condensation product, e.g. melamine-formaldehyde.

The term "borate" includes any compound possessing a borate group which is capable of complexing with the present emulsifying agents, e.g., polyvinyl alcohol and guar gum to form an impermeable coating. As previously mentioned, walls of the microcapsules of the present invention are formed of non-metallic bonds. Boron is considered to be a non-metallic element as defined in *The Van Nostrand Chemist's Dictionary*, D. Van Nostrand Company, Inc., (1953).

The cross-linking or complexing agent is utilized in amounts sufficient to result in the formation of microcapsules. The relative amounts vary with the particular system, and may be easily determined in each case. However, in contradistinction to prior encapsulation processes, the polymeric emulsifying agent is dual functional, and serves not only as an emulsifying agent, i.e., to stabilize the surface of the oil droplet and prevent coalescence, but actually provides the capsular shell. Thus, the polymeric emulsifying agent should be provided in relatively substantial amounts of, for example, at least about 0.5 part by weight of emulsifier per part of cross-linking or complexing agent. Suitable amounts include, for example, between about one and about 100 parts of emulsifier, preferably between about one and about 20 parts emulsifier per part by weight of cross-linking or complexing agent.

Emulsification may be conducted at any suitable temperature. For example, temperatures in the range of between about 20° C. and about 80° C. may normally be used although temperatures outside this range could also be used. If a gelable emulsifying agent is employed, the temperature must obviously be adjusted so as to prevent gelation during the emulsification.

As previously mentioned, a suitable cross-linking agent is an A-stage formaldehyde condensation product, i.e., urea, melamine or phenol-formaldehyde. The term "A-stage" as employed herein is the water-soluble form of the resin which contains a considerable number of methylol groups as defined on page 131 of *A Consise Guide to Plastics*, by Simonds and Church, Second Edition, Reinhold Publishing Co., N.Y. Thus, the A-stage formaldehyde condensation products of the present invention are soluble in water in all proportions in contradistinction to the thermosetting resins that are employed in the encapsulation process of U.S. Pat. No. 3,418,656 to A. E. Vassiliades. The formaldehyde condensation products employed in that patented process are capable of separating in solid particle form upon dilution with water and are thus distinguishable from the resins employed in the process of the present invention.

In many prior systems, the formaldehyde condensation product was employed as the main film-forming agent, whereas in the present system it is employed as a cross-linking agent for the emulsifying agent, which is the main film-forming agent. Accordingly, in prior encapsulation systems, a very large quantity of the formaldehyde condensation product, e.g., urea-formaldehyde, is employed relative to the emulsying agent, if an emulsifying agent is, in fact, used. In the present invention, the ratio of emulsifying agent to formaldehyde condensation product is at least 0.5 part by weight emulsifier per part of the formaldehyde condensation product. Preferably, at least about one part to about 4 parts of emulsifier per part by weight of the condensation product is utilized. Thus, it is essentially preferred that the admixture that is provided to form the microcapsules of the present invention consist essentially of a major portion of emulsifying agent and a minor portion of the formaldehyde condensation product on a weight basis.

By "water immiscible oily materials" is meant lipophilic materials which are preferably liquid, such as oils, which will not mix with water and which are inert with regard to the components of the particular system. Low melting fats and waxes may also be used in this invention. However, oils are the preferred nucleus materials since they do not require temperature maintenance. In certain embodiments of this invention, the vapor pressure and viscosity of the oily material are to be considered. For example, in the art of making a transfer sheet record material, a low viscosity-low vapor pressure oil is preferred. The viscosity of the oily medium is a determining factor in the speed with which the markings can be transferred to the copy sheet since low viscosity oils will transfer more quickly than oils of higher viscosity. The vapor pressure should be sufficiently low to avoid substantial losses of the oil through evaporation during the encapsulation operation. A compromise should, therefore, be made in selecting an oil of medium viscosity which will have a reasonable rate of transfer onto the copy sheet and of reasonably low volatility.

In general, the lipophilic nucleus materials can be natural or synthetic oils, fats and waxes or any combination thereof which will meet the requirements of the use for which the microcapsules are intended. Among the materials which can be used are: natural oils, such as cottonseed oil, castor oil, soybean oil, petroleum lubricating oils, fish liver oils, drying oils and essential oils; synthetic oils, such as methyl salicylate and halogenated biphenyls; low melting fats, such as lard; and liquid or low melting waxes, such as sperm oil and lanolin (wool wax).

The amount of emulsifying agent relative to the oily nucleus material employed will vary over a wide range depending upon the particular system under consideration. However, suitable amounts include between about 5 and about 100 parts of emulsying agent per 100 parts by weight oil, preferably between about 10 and about 50 parts of emulsifying agent per 100 parts by weight oil.

Within the scope of the present invention, the hereindisclosed processes may be used to encapsulate an oil alone, or alternatively, the oil may serve merely as a vehicle for carrying another active ingredient or material. In this latter utility, the active material may be dissolved, dispersed or suspended in the oily material. The processes of this invention can, therefore, be used to encapsulate medicines, poisons, foods, cosmetics, adhesives or any other material which finds utility in microcapsular form.

In the preferred utility of this invention, viz., transfer sheet record material, these processes may be used to encapsulate an oily printing ink, such as may be used in smudge-proof typewriter ribbons or carbon papers. In such a use, it has been found expedient to encapsulate a colorless, water-insoluble dye intermediate dissolved in the oil, thus avoiding the necessity of removing the residual colored matter from the external surfaces of the capsules prior to coating as is required in the encapsulation of printing inks. Colorless dye intermediates are wholly conventional in such utilities and are well known in the art. Exemplary of the colorless dye intermediates which have been contemplated for use in this invention are leuco dyes, such as, crystal violet lactone and derivatives of bis(p-dialkylaminoaryl) methane such as disclosed in U.S. Pat. Nos. 2,981,733 and 2,981,738. These dye intermediates are colorless in an alkaline or neutral medium and react to form a visible color in an acidic medium. Thus, when a capsule containing such a compound is ruptured and the compound is discharged onto an adsorbent, acidic electron-acceptor material, such as a paper web coated with an organic or an inorganic acid material, a visible color appears on the adsorbent material at the point of contact.

Inhibitors may optionally be dispersed in the oily material along with the dye intermediates. Such materials are helpful in preventing the light and heat degradation of the intermediates during the encapsulation procedure, especially when elevated temperatures are required, such as when a fat is encapsulated. Inhibitors are also considered to aid in the stabilization of the colored marking on the copy sheet against the effects of the atmosphere. A small amount (generally about 1 to 10 percent by weight of the dye) of an inhibitor, such as N-phenyl 2-naphthylamine, has been used in the practice of this invention.

The leuco dye intermediates which are mentioned above are, in general, oil soluble. Oils which are inert with respect to the dye and in which the dye has appreciable solubility, e.g. above 0.5 grams of dye per 100 grams of oil, are preferable.

Certain of the emulsifying agents of the type described above give an acidic solution when dissolved in water. Additionally, the complexing of two emulsifying agents may result in an acidic pH. When such materials are utilized to encapsulate an oily material containing a leuco dye intermediate, a color would ordinarily be produced, since these dye intermediates react in an acid medium. To prevent such premature reaction, a basic species or buffer may be incorporated in the emulsion system (usually in the water) in order to maintain a basic pH of the system, even when the emulsifying agent or agents do not result in an acid solution, as this will prevent an undesired or premature reaction of the dye intermediate by exposure to atmospheric conditions, e.g. carbon dioxide adsorption from the atmosphere.

Suitable buffer systems include base-inorganic salt combinations, such as sodium hydroxide-sodium borate decahydrate, while a preferred buffering agent is sodium carbonate, alone. The amount of buffering agent is comparatively quite small and is only that amount sufficient to prevent a premature acid reaction of the dye intermediate. In general, from 0.05 to 01. gram-equivalents of the material such as sodium carbonate, per 3 grams of dye will suffice for such purposes. Such a material in the prescribed amounts does not interfere with the color reaction of the dye intermediates once they have been transferred to a copy sheet containing an electron-acceptor adsorbent material. Ordinarily, a buffer system need not be employed when the encapsulated material is not acid reactive.

As previously mentioned, the selected emulsifying agent or combination of emulsifying agents must have a hydrophillipophil balance (HLB) similar to that of the oil used. Based on experimental data, most of the common oils and emulsifying agents have ascribed HLB values (see *Remington's Practice of Pharmacy*, 11th edition, Mack Publishing Company, 1956, at page 191, the disclosure of which is incorporated herein by reference). Thus, by using these figures, the emulsifying agent or combination of emulsifying agents can be selected to match the HLB value of the particular oil utilized. If the HLB value for the emulsifying agent(s) is dissimilar to that of the oil, an unstable oil-in-water emulsion results and encapsulation is prevented. For example, an emulsifying agent having an HLB value approximately 10 is necessary to form a stable emulsion of light petroleum in water. As the HLB value for the selected emulsifying agents proceeds downwardly to about 4, this oil-in-water emulsion tends to become more unstable and will ultimately invert to a water-in-oil emulsion.

The HLB of blends of two or more emulsifying agents can be calculated by proportion. However, in such combinations, certain antagonisms are evidenced within single classes of emulsifiers. For example, when an aqueous, colloidal dispersion of pigskin gelatin (at a lowered pH) and agar is prepared, the gelatin and agar are incompatible. This incompatibility can be explained by the phenomenon of coacervation since agar is always a negatively charged colloid and gelatin, at a pH below its iso-electric point (which is about pH 9), is highly positive. It follows, therefore, that the gelatin-agar dispersion will be compatible when in an alkaline medium, i.e., when gelatin is above its iso-electric point. Similarly, gelatin is compatible (for the purposes of this invention) with copolymers of methyl vinyl ether and maleic anhydride, which copolymer forms a negatively charged colloid, when the gelatin is at a pH above its iso-electric point, i.e., a negatively charged colloid.

In the case where the HLB balance of the oily material has to be matched by a combination of two or more emulsifying agents, at least one of the emulsifying agents should be capable of cross-linking or complexing with the added cross-linking or complexing agent.

The water may be added to the emulsifying agent-oil mixture either quickly or slowly with agitation. If the water is added slowly to the oil phase containing the emulsifying agent or agents, a water-in-oil emulsion is formed, which eventually is inverted to an oil-in-water emulsion with the further addition of water. Such an inversion step results in a more stable emulsion with some systems, e.g a methylcellulose emulsifier system.

The ultimate size of the microcapsules is dependent upon the speed of the mixing during the emulsification process. Higher mixing speeds will break up the oil phase of the emulsion into smaller droplets and thereby produce smaller capsules. In some instances, such as when a water-insoluble dye intermediate is dissolved in the oily material and the resulting microcapsules are to be utilized in producing transfer sheet record material, the smaller capsules are preferred since they can be packed more closely to each other. When the capsules are closely packed, a more uniform marking results (i.e., less discontinuity is obtained) when the microcapsules are ruptured. Microcapsules having diameters ranging from 0.1 to several hundred microns can be produced by the process of this invention. However, capsules having diameters in the range of 0.5 to 5.0 microns are preferred for transfer copy systems.

The temperature of emulsification may be varied over a broad range. The temperature must be kept above the gelling point of the emulsifying agent or agents only if a gelable emulsifying agent is used. Therefore, when a nongelable emulsifying agent is used, e.g. polyvinyl alcohol, the temperature during emulsification can be varied appreciably without altering the final desired results. Of course, such variation must be kept within reasonable limits, so as not to influence the solubilities of the emulsifying agent, encapsulated material, e.g. a dye intermediate, etc., to an undue extent.

Subsequent to the emulsification process, the cross-linking or complexing agent is added to the oil-in-water emulsion, slowly, and with brisk agitation to form the final microcapsules. Agitation may be achieved by means of a high speed mixer or impeller, by ultrasonic waves or by other conventional means.

If the emulsifying agent is of the self-complexing variety, the cross-linking or complexing agent comprises the same material as the emulsifying agent, and need not be added in a separate step.

Alternatively, the emulsion containing the microcapsules may be either coated directly onto a web material and dried or the microcapsules may be separated from the emulsion by some physical means such as filtration or centrifugation; washed to remove any excess oil; redispersed in a solution of a binder; coated onto a web material and dried. Suitable binders include methyl cellulose, starch, casein, polyvinyl alcohol, synthetic latex, and styrene-butadiene rubber. Alternatively, materials such as urea-formaldehyde or melamine-formaldehyde condensates may be employed.

In one embodiment of the encapsulation process, the oil-in-water emulsion is prepared by dissolving the emulsifying agent (or agents) with the proper HLB in water and subsequently adding the oily material to the water solution with agitation until complete emulsification has occurred. The emulsion may then be diluted with water to give the desired viscosity suitable for coating. Care must be taken not to utilize too large an excess of water when a transfer copy system is desired or the concentration of microcapsules will be reduced and the intensity of the markings produced will be lowered since there will be fewer capsules per unit area to be broken. Capsule diameters suitable for transfer copy systems, i.e., within the 0.5 to 5.0 micron range, are likewise obtainable by adding cross-linking or complexing agents with agitation as previously described.

The microencapsulated oils of this invention are suitable for use in the manufacture of transfer sheet record material. More specifically, capsules containing a leuco dye intermediate in the oil are to be coated onto one side of a web material and dried. The coating operation is performed by conventional means, such as by use of an air knife. The capsule coatings are dried at temperatures ranging from about 40° to 75° C. At these temperatures, no appreciable degradation of the capsules, and in particular, the leuco dye intermediate, takes place.

The web material commonly used in transfer sheet record material is paper and is, therefore, preferable in the practice of this invention. However, the microcapsules produced by the herein disclosed processes are also capable of being coated onto other materials such as plastic and fabric or textile webs. When using a web material having a high degree of porosity, it is advisable to pre-coat the web with a material which will reduce seepage of the microcapsular coating through the web. Impregnating the web material with polyvinyl alcohol or a butadiene-styrene latex is the conventional practice for producing an essentially impervious substrate.

Transfer sheets made according to the various embodiments of this invention have a pleasant appearance and are almost completely smudge-proof when brought into face-to-face contact with a copy sheet containing a coating of an adsorbent electron-acceptor material. In addition, they show a marked improvement over the transfer sheets presently available in commerce. It has been found that coated paper comprising microcapsules which contain a leuco dye intermediate dissolved in the oil and which microcapsules are formed by the process of this invention are extremely stable. For example, exposure of the coated papers to direct sunlight for five hours, to a temperature of 65° C. for 16 hours, and to a temperature of 60° C. for 17 hours in a 90 percent relative humidity environment does not alter either the pleasant appearance or the transfer and color-forming properties of the paper.

The following examples illustrate the best modes contemplated for carrying out this invention:

EXAMPLE 1

A primary oil-in-water emulsion is formed by adding 50 milliliters of cottonseed oil containing 2 grams of 1-[bis(p-dimethylaminophenyl)methyl]-pyrrolidine (a leuco auramine dye intermediate) to 10 grams of a purified gelatin having an HLB similar to that of the oil which is dissolved in 100 grams of water containing 5 milliliters 5 N $Na_2CO_3$ solution (for the prevention of a premature reaction of the dye intermediate) at a temperature of about 50° C. over a period of 20 to 30 minutes. Subsequently, 100 milliliters of a 1 M formaldehyde solution in water are slowly added to the emulsion with brisk agitation followed by the addition of 50 milliliters of water. The addition of the formaldehyde results in the formation of well-defined microcapsules.

The microcapsules are then filtered, washed with successive 50 milliliter portions of water, methanol and formalin solution, and redispersed in 100 milliliters of water containing 4 grams of a binding agent comprising methyl cellulose. The solution of methyl cellulose containing the microcapsules is coated onto a paper web and dried at 50°–60° C.

The following examples illustrate the employment of a non-gelable emulsifying agent in the process of this invention.

EXAMPLE 2

One hundred grams of water, containing 5 grams of polyvinyl alcohol and 5 milliliters of 5 N $Na_2CO_3$ are emulsified with 35 milliliters of cottonseed oil (containing 1 gram of 1-[bis(p-dimethylaminophenyl)methyl]-pyrrolidine) for a period of 20 to 30 minutes. One hundred and fifty milliliters of a 1 M sodium borate decahydrate solution are slowly added to the emulsion with brisk agitation, resulting in the formation of microcapsules which can be seen under an ordinary microscope. The emulsion containing the microcapsules is coated onto a paper web and dried at between 50° and 60° C.

EXAMPLE 3

Eight grams of methylcellulose are dispersed in 25 milliliters of cottonseed oil (containing 1-[bis(p-dimethylaminophenyl)methyl]-benzotriazole) and this dispersion is emulsified by the slow addition of 100 milliliters of water. The addition of a few milliliters of water (10 to 15) results in a water-in-oil emulsion, which inverts to an oil-in-water emulsion with the further addition of water. Following emulsification, 3 grams of Jaquar-2Sl (a derivative of guar gum) are slowly added to the emulsion with brisk agitation, followed by the addition of 100 ml of water (containing 0.1 gram-equivalents of Na$_2$CO$_3$). The addition of the Jaquar results in the formation of well-defined microcapsules (seen under an ordinary microscope) evenly dispersed throughout the emulsion. The emulsion containing the microcapsules is subsequently coated onto a paper web and dried at about 50° to 60° C.

EXAMPLE 4

Ten grams of gum arabic are dissolved in 100 grams of water and the solution is emulsified with 25 milliliters of soybean oil (containing 1 gram of 1-[bis(p-dimethylaminophenyl)methyl]-benzotriazole). Subsequently, 10 grams of a maleic anhydride-methyl vinyl ether copolymer (Gantrez-139) are added to the emulsion and emulsification is allowed to proceed for 10 to 15 additional minutes. The subsequent addition of 10 milliliters of ethylene diamine slowly and with brisk agitation results in the formation of well-defined microcapsules. The emulsion containing the microcapsules is coated onto a paper web and dried at about 50° to 60° C.

EXAMPLE 5

Into a solution of 180 grams of water (containing 25 grams of a copolymer maleic anhydride and methyl vinyl ether (Gantrez) and enough Na$_2$CO$_3$ bring the pH to 8.5, 50 milliliters of chlorinated biphenyls Arochlor No. 1248 containing 2 grams of 1[bis(p-dimethylaminophenyl)methyl]-pyrrolidine are added and emulsified for approximately 15 to 20 minutes. To the emulsion, 20 milliliters of 10 percent by weight gelatin in water solution are added slowly and with brisk agitation. The addition of the gelatin solution results in well-defined microcapsules, evenly dispersed throughout the emulsion. The emulsion is subsequently coated onto a paper web and dried at about 50° to 60° C.

EXAMPLE 6

Into 200 grams of water, containing 8 grams of methyl vinyl ether-maleic anhydride copolymer (Gantrez-139) and enough Na$_2$CO$_3$ to bring the pH to 8.5, 50 milliliters of castor oil (containing 2 grams of 1-[bis(p-dimethylaminophenyl) methyl]-benzotriazole) are added and emulsified. Subsequently, 2 grams of gum tragacanth are added to the emulsion with brisk stirring, resulting in the formation of well-defined microcapsules, evenly dispersed throughout the emulsion. The emulsion is coated onto a paper web and dried at about 50° to 60° C.

EXAMPLE 7

Five hundred grams of a 6 percent by weight aqueous solution of methylcellulose (25 centipoises) are charged to a Waring blender. Under conditions of brisk agitation, 100 grams of a solution containing 2.1 percent crystal violet lactone and 1.8 percent benzolleucomethylene blue in a 50/50 mixture of chlorinated biphenyl and coconut oil is added and the agitation continued for about five minutes, or until emulsion droplets having an average diameter of about four microns are obtained.

Next, the agitation rate is reduced to a point sufficient to maintain efficient mixing and 15 grams of a 40 percent aqueous solution of glyoxal is added. After mixing for an additional ten minutes, the mixture is transferred to a breaker employing mild agitation, where the mixture is heated to 60° C. and maintained at this temperature for five hours to effect cross-linking.

After cooling the resulting capsular suspension, 150 grams of a 5 percent aqueous solution of hydroxyethyl cellulose are added. The dispersion is then coated onto a paper web substrate and dried to provide a pressure-rupturable transfer sheet.

EXAMPLE 8

The procedure of Example 7 is repeated with the exception that 15 grams of water-soluble, partially-condensed (i.e., A-stage) malamine-formaldehyde polymer is substituted for the glyoxal and 3.7 grams of 20 percent NH$_4$Cl is added as a curing (cross-linking) catalyst. An hydroxyethyl cellulose binder is added and the resulting capsular slurry is coated onto a paper web and dried to provide a pressure-rupturable transfer sheet.

EXAMPLE 9

Fifty grams of urea are dissolved in 171 grams of 37 percent aqueous formaldehyde solution in a two-liter, three-necked flask equipped with thermometer, stirrer, reflux condenser and heating mantel. The solution is adjusted to pH 8 with 10 percent NaOH solution and is then refluxed for one hour, whereupon 1250 grams of a 6 percent aqueous polyvinyl alcohol solution and 3.5 milliliters of glacial acetic acid are added. The reaction is then continued at reflux for six hours and then cooled to room temperature and neutralized to pH 7 with ammonium hydroxide to provide a self cross-linking reaction mixture.

One hundred grams of the dye solution of Example 7 are emulsified in 784 grams of the self cross-linking reaction product in the same manner as described in Example 7. After the emulsification is complete, 12 grams of 20 percent aqueous NH$_4$Cl solution are added to acidify the suspension and it is then heated for four hours at 60° C. to effect cross-linking. This microcapsular suspension is then formulated into a coating slurry and coated onto a paper substrate.

EXAMPLE 10

Five grams of urea are dissolved in 17.1 grams of a 37 percent aqueous formaldehyde solution, neutralized to pH 8 with 10 percent NaOH solution, and refluxed for one hour. Then, 294 grams of a 5.1 percent aqueous solution of methylcellulose and 0.8 milliliters of glacial acetic acid are added and the reaction continued at 80° C. for six hours. A self cross-linking emulsifying agent is thereby produced.

The solution containing the emulsifying agent is placed in a Waring blender and used to emulsify 50 grams of dye solution as described in Example 7. The emulsion is then heated for six hours at 60° C. to give a microcapsular suspension which is formulated into a coating slurry and coated onto a paper substrate.

EXAMPLE 11

A mixture of 667 grams of 6 percent aqueous polyvinyl alcohol solution, 40 grams of a 65 percent aqueous dispersion of a partially condensed (i.e., B-stage) urea-formaldehyde thermosetting resin, and 7.8 grams of 20 percent NH$_4$Cl is heated at 60° C. for six hours. After cooling to room temperature, this self cross-linking reaction product is used to emulsify 100 grams of the dye solution of Example 7. The emulsion is then heated for four hours at 60° C. to give a microcapsular suspension onto a paper substrate.

In all of the foregoing Examples, the HLB of the particular oil was matched to approximate the emulsifying agents utilized. All percentages given in this application are on a weight basis, unless otherwise specified.

Although the invention has been described in considerable detail with particular reference to certain preferred embodiments thereof, variations and modifications can be effected within the spirit and scope of the invention as described hereinbefore, and as defined in the appended claims.

I claim:

1. A process for the formation of microcapsules having non-proteinaceous walls, in the absence of coacervation, which comprises the steps of:

(A) forming a primary oil-in-water emulsion, which emulsion comprises a water-immiscible oily material dispersed in the form of microscopic droplets in a colloidal solution of a non-proteinaceous, polymeric emulsifying agent having about the same hydrophil-lipophil balance as the oily material, said emulsifying agent being selected from the group consisting of an emulsifying agent possessing cross-linkable groups and an emulsifying agent possessing complexing sites; and (B) forming an impermeable coating around said dispersed oil droplets solely by adding to the aqueous phase of said emulsion a member different from said emulsifying agent and selected from the group consisting of gum tragacanth and a borate under conditions of brisk agitation, said member reacting with said non-proteinaceous emulsifying agent so as to form a non-proteinaceous impermeable coating around said dispersed oil droplets.

2. The process of claim 1 wherein said added member is gum tragacanth.

3. The process of claim 1 wherein said added member is a borate.

4. The process of claim 3 wherein said borate is sodium borate.

5. The process of claim 4 wherein said emulsifying agent is polyvinyl alcohol.

6. The process of claim 2 wherein said emulsifying agent is a copolymer of methyl vinyl ether and maleic anhydride.

* * * * *